United States Patent
Kubisch et al.

(10) Patent No.: US 9,342,857 B2
(45) Date of Patent: May 17, 2016

(54) TECHNIQUES FOR LOCALLY MODIFYING DRAW CALLS

(71) Applicant: NVIDIA Corporation, Santa Clara, CA (US)

(72) Inventors: Christoph Kubisch, Aachen (DE); Markus Tavenrath, Aachen (DE)

(73) Assignee: NVIDIA Corporation, Santa Clara, CA (US)

( * ) Notice: Subject to any disclaimer, the term of this patent is extended or adjusted under 35 U.S.C. 154(b) by 250 days.

(21) Appl. No.: 13/853,531

(22) Filed: Mar. 29, 2013

(65) Prior Publication Data

US 2014/0292771 A1    Oct. 2, 2014

(51) Int. Cl.
*G06T 1/20* (2006.01)

(52) U.S. Cl.
CPC ........................................ *G06T 1/20* (2013.01)

(58) Field of Classification Search
None
See application file for complete search history.

(56) References Cited

U.S. PATENT DOCUMENTS

| | | | | |
|---|---|---|---|---|
| 8,614,716 | B2* | 12/2013 | Roy et al. | 345/522 |
| 2005/0122332 | A1* | 6/2005 | Boyd et al. | 345/501 |
| 2013/0135341 | A1* | 5/2013 | Seetharamaiah et al. | 345/619 |
| 2013/0141448 | A1* | 6/2013 | Yokota et al. | 345/522 |

* cited by examiner

*Primary Examiner* — Maurice L McDowell, Jr.
*Assistant Examiner* — Donna J Ricks
(74) *Attorney, Agent, or Firm* — Artegis Law Group, LLP

(57) ABSTRACT

One embodiment sets forth a method for modifying draw calls using a draw-call shader program included in a processing subsystem configured to process draw calls. The draw call shader receives a draw call from a software application, evaluates graphics state information included in the draw call, generates modified graphics state information, and generates a modified draw call that includes the modified graphics state information. Subsequently, the draw-call shader causes the modified draw call to be executed within a graphics processing pipeline. By performing the computations associated with generating the modified draw call on-the-fly within the processing subsystem, the draw-call shader decreases the amount of system memory required to render graphics while increasing the overall processing efficiency of the graphics processing pipeline.

22 Claims, 8 Drawing Sheets

TECHNIQUES FOR LOCALLY MODIFYING DRAW CALLS

BACKGROUND OF THE INVENTION

1. Field of the Invention

The present invention generally relates to graphics processing and, more specifically, to techniques for locally modifying draw calls.

2. Description of the Related Art

In conventional graphics processing systems, to render a graphics scene, a software application first sets up the scene. In so doing, the software application defines the draw calls that are to be executed to render the graphics scene. Each draw call includes graphics state information. During setup, the software application usually pre-calculates the graphics state information for each draw call and stores this information in memory.

One drawback to this approach, however, is that the size of the graphics state data required to render many graphics scene is quite large. For example, to render a scene comprised of 1,000,000 sunflowers each of which includes 1000 objects, the central processing unit (CPU) may pre-calculate 1,000,000,000 sets of graphics state information. As the complexity of the graphics scene increases, the size of the graphics state data also increases. The volume of data may strain, and possibly exceed, the available system memory. Further, transferring this data from the CPU to the graphics processing unit (GPU) may exceed the system memory bandwidth, thereby becoming a bottleneck in the graphics processing pipeline and hindering overall system performance.

In another approach, the amount of system memory used to render a graphics scene can be reduced by delaying one or more of the calculations for some draw calls until this information is requested by the GPU during rendering. For example, to determine which objects to render during culling, the GPU and CPU may work together to determine the draw calls and the included graphics state information. More specifically, the GPU passes relevant information to the CPU, then the CPU processes this information, then the CPU passes the results back to the GPU, and finally the GPU starts to render. Unfortunately, this approach requires synchronization between the GPU and CPU. The CPU may be stalled waiting for the GPU to generate the relevant information (e.g., rendering previous frames). And the GPU may be stalled waiting for the CPU to process this information. Thus, although such a technique reduces memory usage, synchronization operations can stall the graphics processing pipeline, thereby negatively impacting overall system performance. Furthermore, this approach increases the amount of data transferred between the GPU and CPU, exacerbating any system memory bandwidth problem.

As the foregoing illustrates, what is needed in the art is a more effective way to generate draw calls and the graphics state information associated with those draw calls.

SUMMARY OF THE INVENTION

One embodiment of the present invention sets forth a method for processing draw calls in a processing subsystem. The method includes receiving a draw call from a software application, evaluating graphics state information included in the draw call, generating via a shader program modified graphics state information, generating a modified draw call that includes the modified graphics state information, and causing the modified draw call to be executed within a graphics processing pipeline.

One advantage of the disclosed approach is that a draw-call shader program allows draw call calculations to be executed on-the-fly instead of pre-calculated by the CPU and subsequently stored in system memory. Thus, the amount of system memory used to render graphics may be significantly reduced. Furthermore, since such data is generated locally (i.e., within the parallel processing subsystem), the amount of data transferred between the CPU and the parallel processing system may be correspondingly reduced. Consequently, the likelihood of straining the system memory bandwidth may be decreased compared to prior-art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
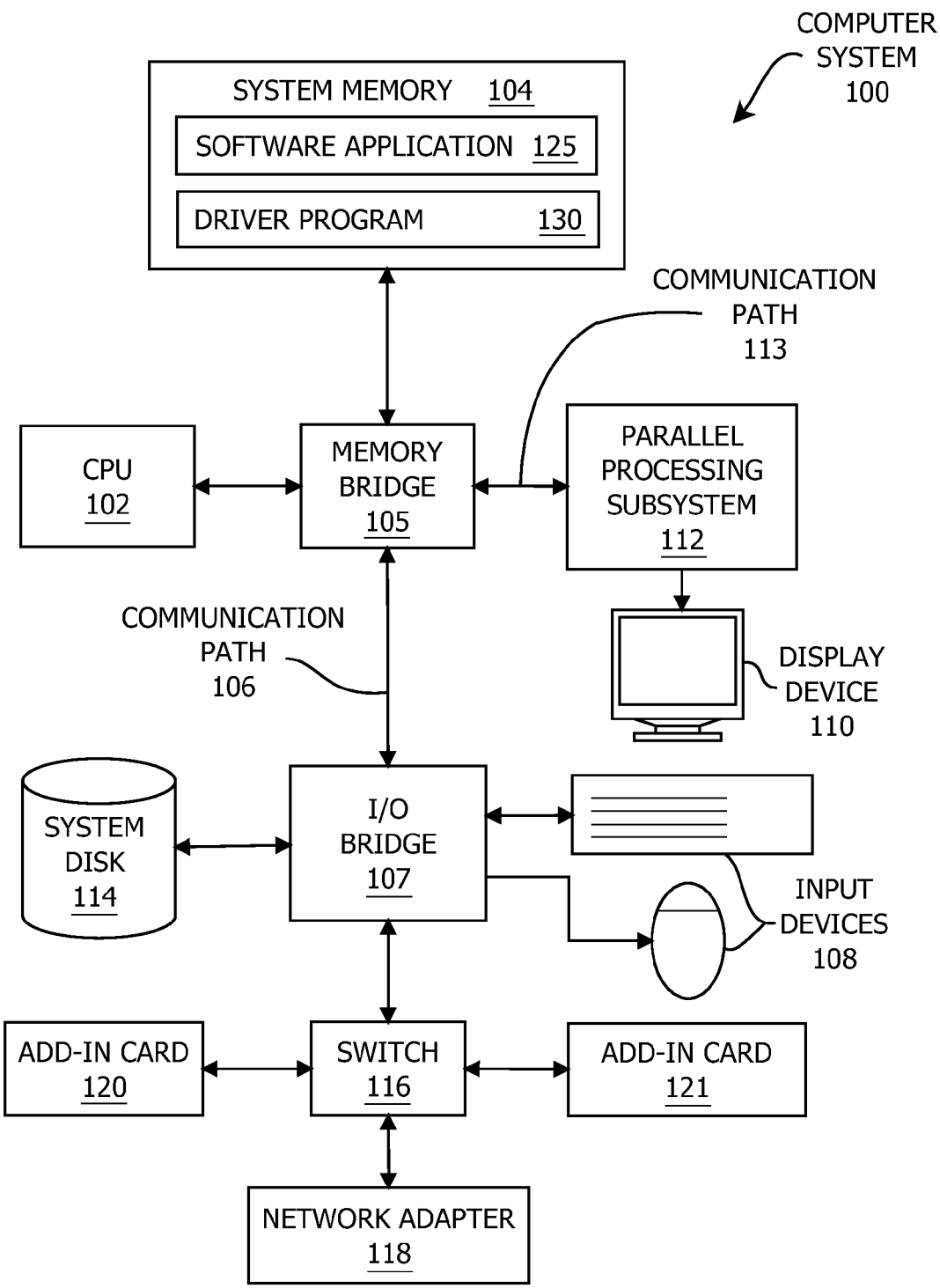
FIG. 1 is a block diagram illustrating a computer system configured to implement one or more aspects of the present invention.

FIG. 1 is a block diagram illustrating a computer system configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output)

bridge 107. I/O bridge 107, which may be, e.g., a Southbridge chip, receives user input from one or more user input devices 108 (e.g., keyboard, mouse) and forwards the input to CPU 102 via a communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
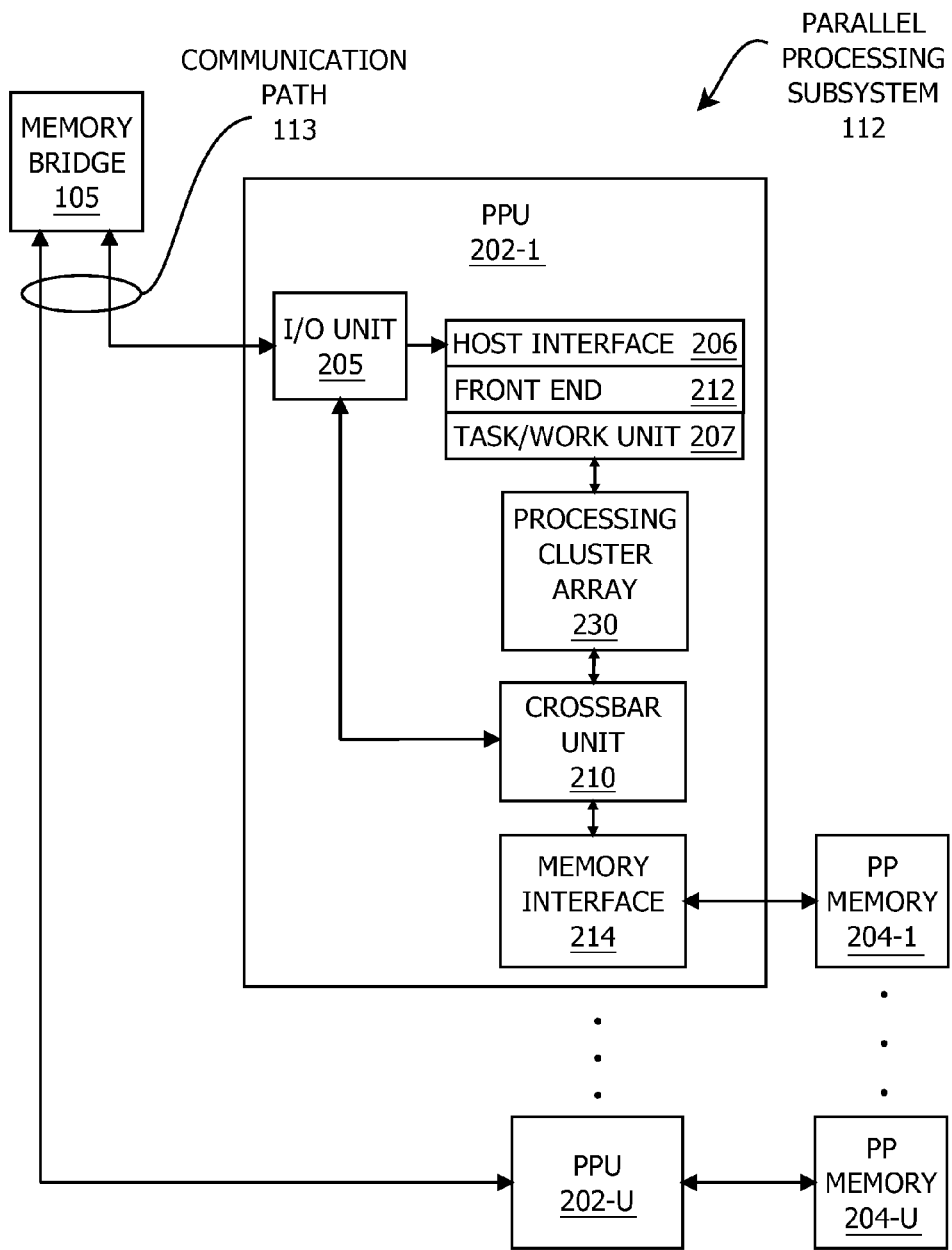
FIG. 2 is a block diagram illustrating the parallel processing subsystem of FIG. 1 in greater detail, according to one embodiment of the present invention.

FIG. 2 is a block diagram illustrating the parallel processing subsystem 112 of FIG. 1 in greater detail, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and hyphenated numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. Those commands may originate within a software application 125 resident in system memory 104 and executing on CPU 102. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by software application 125 via a driver program 130 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, the PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. The I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. The host interface 206 reads each pushbuffer and outputs the command stream stored in the pushbuffer to a front end 212.

Each PPU 202 advantageously implements a highly parallel processing architecture. As shown, PPU 202-1 includes a processing cluster array 230. The processing cluster array 230 receives processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed).

The processing cluster array 230 may process data to be written to the parallel processing memory 204. In some embodiments, the crossbar unit 210 is configured, among other things, to route the output of the processing cluster array 230 to the input of a memory interface 214. The processing cluster array 230 communicates with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cluster array 230 to communicate with system memory 104 or other memory that is not local to PPU 202. In the embodiment shown in FIG. 2, crossbar unit 210 is directly connected with I/O unit 205.

The processing cluster array 230 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory 204, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3:
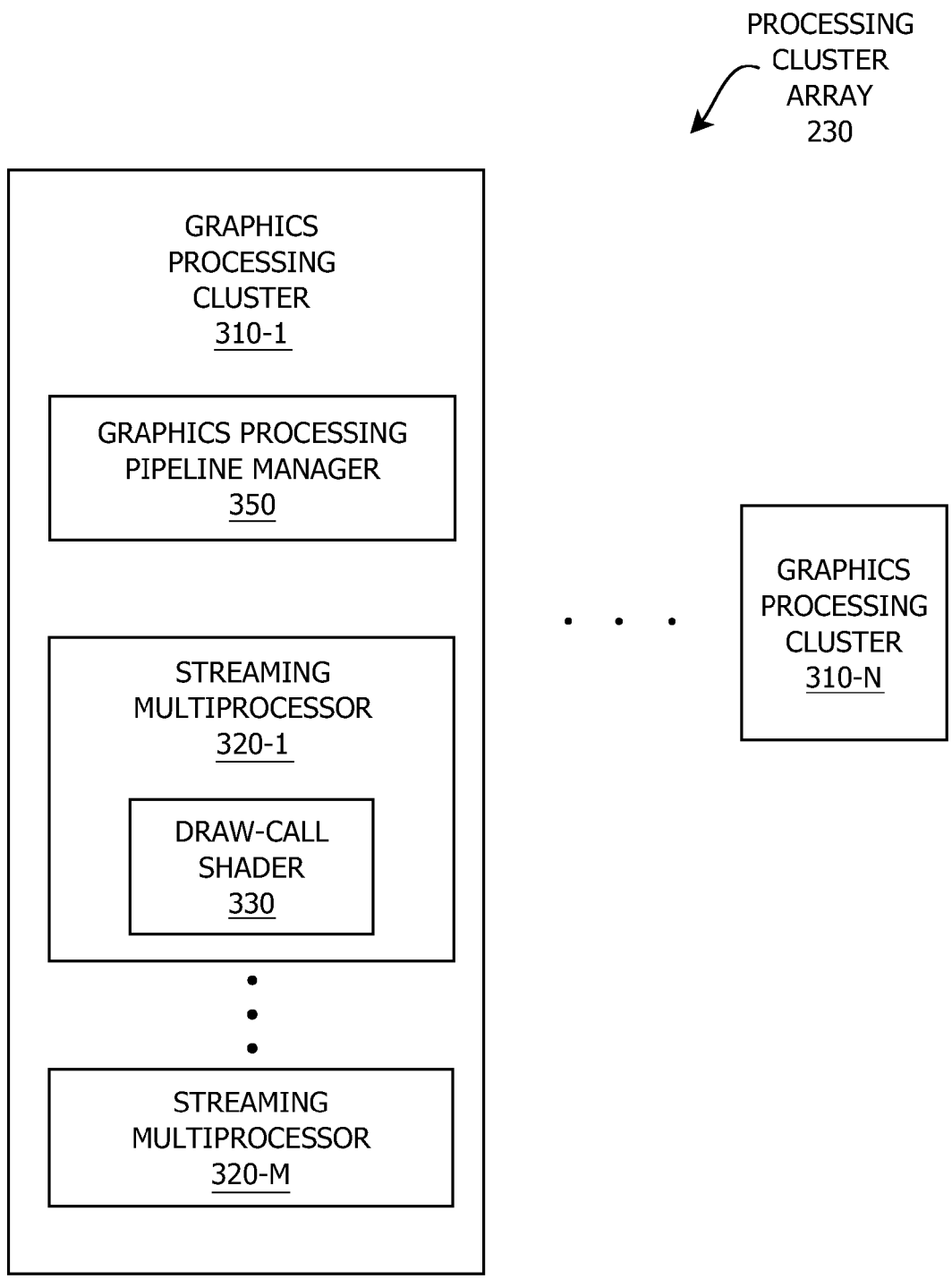
FIG. 3 is a block diagram illustrating the processing cluster array of FIG. 2 in greater detail, according to one embodiment of the present invention.

FIG. 3 is a block diagram illustrating the processing cluster array 230 of FIG. 2 in greater detail, according to one embodiment of the present invention. As shown, processing cluster array 230 includes a number N of general processing clusters (GPCs) 310, where N≥1. Each GPC 310 is capable of executing a large number (e.g., hundreds or thousands) of threads concurrently, where each thread is an instance of a program. In various applications, different GPCs 310 may be allocated for processing different types of programs or for performing different types of computations. The allocation of GPCs 310 may vary dependent on the workload arising for each type of program or computation.

Again, each GPC 310 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 310. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of each GPC 310 is advantageously controlled via a graphics processing pipeline manager 350 that distributes processing tasks to one or more streaming multiprocessors (SMs) 320 included in each GPC 310, where each SM 320 is configured to process one or more thread groups. As shown, one or more SMs 320 may be configured to execute a draw-call shader 330 program. In operation, the draw-call shader 330 receives a draw call from the software application 125. The draw-call shader 330 program then evaluates and modifies the draw call locally. In other words, the modifications made by the draw-call shader 330 affect only the specific draw call currently being processed by the draw-call shader 330. Finally, the draw-call shader 330 causes the modified draw call to be executed within a graphics processing pipeline that executes within the GPC 310. In alternate embodiments, the modified draw call may be executed in another GPC 310 or in any other processors included in the parallel processing subsystem 112.

The series of instructions transmitted to a particular GPC 310 constitutes a thread, as previously defined herein, and the collection of a certain number of concurrently executing threads across the parallel processing engines (not shown) within an SM 320 is referred to herein as a "warp" or "thread group." As used herein, a "thread group" refers to a group of threads concurrently executing the same program on different input data, with one thread of the group being assigned to a different processing engine within SM 320. A thread group may include fewer threads than the number of processing engines within SM 320, in which case some processing engines will be idle during cycles when that thread group is being processed. A thread group may also include more threads than the number of processing engines within SM 320, in which case processing will take place over consecutive clock cycles. Additionally, a plurality of related thread groups may be active (in different phases of execution) at the same time within an SM 320. This collection of thread groups is referred to herein as a "cooperative thread array" ("CTA") or "thread array."

Advantageously, the specialized design and operation of SM 320 typically allow SM 320 to perform certain tasks, such as graphics-related operations, much faster than the CPU 102 of FIG. 1. Thus, since the draw-call shader 330 executes within the SM 320, the draw-call shader 330 will typically perform graphics-related operations substantially faster than the CPU 102 could perform such operations.

In some embodiments, SM 320 also includes memory storage (not shown), such as local memory or parameter memory, with different levels of accessibility. For example, the included memory storage may support a pattern of data sharing in which any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Again, advantageously, the draw-call shader 330 executes within SM 320. Consequently, the draw-call shader 330 may access memory associated with the parallel processing subsystem 112 without negatively impacting the system memory bandwidth. In various embodiments, the memory associated with the parallel processing subsystem 112 may include at least a portion of one or more of the memories associated with any of the PPUs 202 of FIG. 2, such as on-chip memory or one of the parallel processing memories 204 of FIG. 2. One skilled in the art will appreciate that the scope of the draw-call shader 330 includes all mechanisms that allow the parallel processing subsystem 112 to access memory associated with the parallel processing subsystem 112.

It will be appreciated that the core architecture described herein is illustrative and that variations and modifications are possible. Any number of processing units, e.g., SMs 320, may be included within a particular GPC 310. Further, the processing cluster array 230 may include any number of GPCs 310 that are advantageously functionally similar to one another so that execution behavior does not depend on which GPC 310 receives a particular processing task. Further, each GPC 310 advantageously operates independently of other GPCs 310 using separate and distinct processing units to execute tasks for one or more application programs.

Persons of ordinary skill in the art will understand that the architecture described in FIGS. 1-3 in no way limits the scope of the present invention and that the techniques taught herein may be implemented on any properly configured processing unit, including, without limitation, one or more CPUs, one or more multi-core CPUs, one or more PPUs 202, one or more GPCs 310, one or more graphics or special purpose processing units, or the like, without departing the scope of the present invention.

Processing Draw Calls

Figure 4:
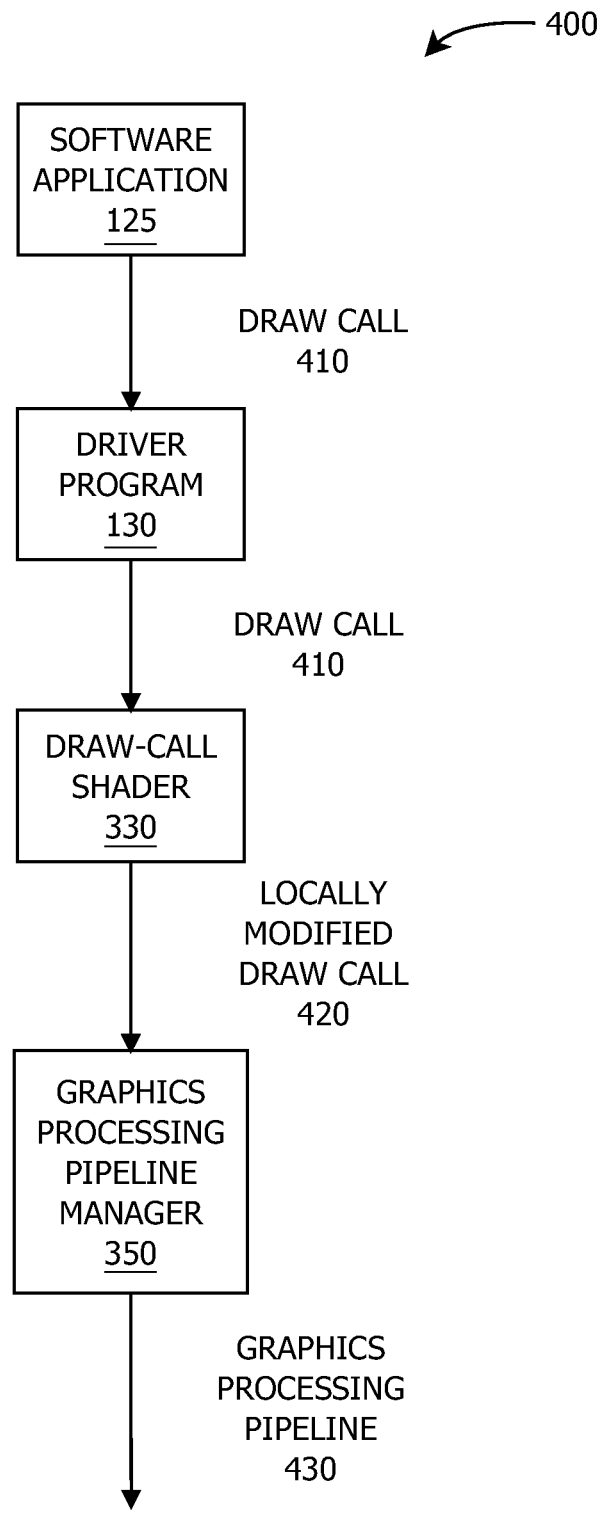
FIG. 4 is a conceptual diagram illustrating the processing of a draw call within the computer system of FIG. 1, according to one embodiment of the present invention.

FIG. 4 is a conceptual diagram illustrating the processing of a draw call within the computer system of FIG. 1, according to one embodiment of the present invention. As shown, the subsystem 400 includes, without limitation, the software application 125 and the driver program 130 of FIG. 1, the draw-call shader 330 and the graphics processing pipeline manager 350 of FIG. 3, a draw call 410, a locally modified draw call 420, and a graphics processing pipeline 430.

To render a graphics scene, embodiments of the present invention implement draw commands, where each such draw command includes a set of one or more draw calls 410. A given draw command is typically associated with a particular graphics object within a graphics scene that is being rendered by the PPU 202 of FIG. 2 within which aspects of the subsystem 400 of FIG. 4 are implemented. As described in greater detail here, embodiments of the present invention enable draw calls 410 to be modified locally within the GPU (i.e., PPU 202) by the draw-call shader 330 before rendering a graphics scene. Consequently, many draw call calculations that were pre-calculated and subsequently stored in the system memory 104 of FIG. 1 by the CPU 102 of FIG. 1 in prior-art approaches may be performed on-the-fly by the draw-call shader 330. As a result, the amount of system memory 104 used to render a graphics scene may be significantly reduced. Furthermore, since such data is generated locally (i.e., within the parallel processing subsystem 112 of FIG. 1), the amount of data transferred between the CPU 102 and the parallel processing system 112 may be correspondingly reduced.

As indicated in FIG. 4, before a graphics scene is rendered, the software application 125 first has to set up the graphics scene. As part of the set-up, the software application 125 specifies the different draw calls that are to be executed to render the graphics scene. In some embodiments, the software application 125 specifies "dummy" draw calls 410, which contain information that is incomplete or intended to be overwritten by the draw-call shader 330. After setting-up the graphics scene, the software application 125 passes the different draw calls 410 needed to render the graphics scene to the driver program 130. In some embodiments, the software application 125 also causes the driver program 130 to store the draw calls 410 in a command buffer (not shown) within memory associated with the parallel processing subsystem 112. The driver program 130 then causes each draw call 410 to be passed to the draw-call shader 330.

Upon receiving a particular draw call 410, the draw-call shader 330 evaluates the draw call to determine which graphics state information included in the draw call to modify. In some implementations, as part of this evaluation, the draw-call shader 330 may determine not to modify the draw call 420. Similarly, the draw-call shader 330 may elect to expand the information included in the draw call 410 by including additional data. For example, the draw-call shader 330 may determine that particular information is absent from a "dummy" draw call 410 and, therefore, elect to modify the draw call 410 to include the missing information. Subsequently, the draw-call shader 330 generates the locally modified draw call 420 in any technically feasible fashion. For example, the draw-call shader 330 may use the draw call 410 in conjunction with any amount of accessible data to calculate information to include in the modified draw call 420. Note that any modifications that the draw-call shader 330 makes will only directly affect the current locally modified draw call 420. In other words, the modifications will not change any proceeding or subsequent draw calls 410, nor will the modifications change any proceeding or subsequent locally modified draw calls 420.

Advantageously, since the draw-call shader 330 precedes the graphics processing pipeline 430, the draw-call shader 330 may be configured to generate a modified draw call 420 that passes information to one or more further shader stages (e.g., all shader stages in the graphics processing pipeline 430). For example, in one embodiment, the draw-call shader 330, before calculating vertex data, could determine that a particular vertex attribute was constant over all of the vertices affected by the draw call 420. In such a case, the draw call shader 330 would advantageously increase overall execution speed by calculating the vertex attribute once, instead of once per vertex.

Again, the draw-call shader 330 may access memory associated with the parallel processing subsystem 112, such as data from previous rendering operations. For example, in one embodiment, the draw-call shader 330 could be configured to perform a visibility test using data from previous rendering operations to determine whether the primitive associated with the draw call 410 is visible. If the draw-call shader 330 determined that the primitive was not visible, then the draw call shader would generate a locally modified draw call 420 that, when executed by the graphics processing pipeline 430, would not result in image data being rendered for display. Advantageously, since the draw-call shader 330 may access memory associated with the parallel processing subsystem 112 without transferring any information to the CPU 102, such memory accesses do not require synchronization operations that could negatively impact overall system performance or system memory bandwidth.

As shown, after generating the locally modified draw call 420, the draw-call shader 330 passes the locally modified draw call 420 to the graphics processing pipeline manager 350. Upon receiving the locally modified draw call 420, the graphics processing pipeline manager 350 causes the locally modified draw call 420 to execute within the graphics processing pipeline 430. In alternate embodiments, the draw-call shader 330 may cause the locally modified draw call 420 to execute within the graphics processing pipeline 430 in any other technically feasible fashion.

Figure 5:
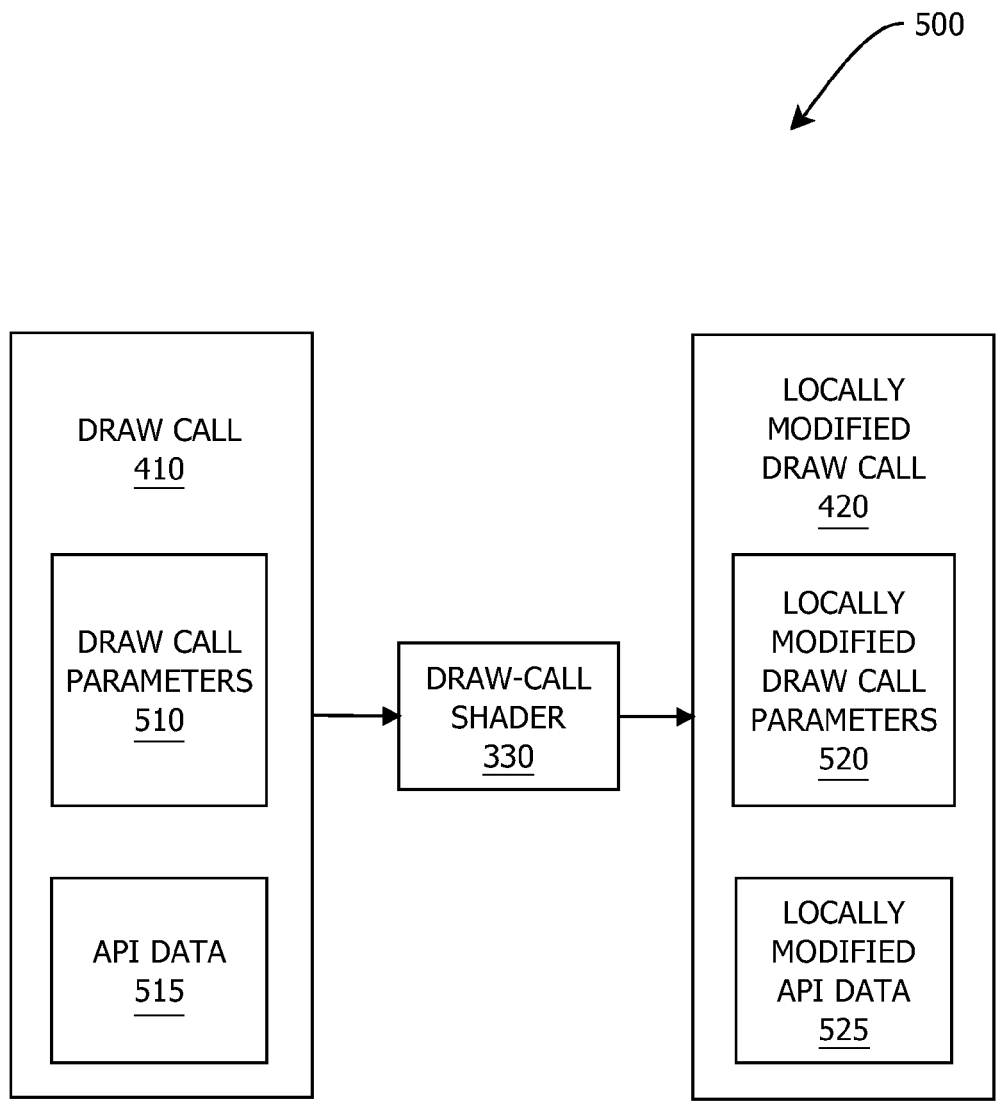
FIG. 5 is a conceptual diagram illustrating the draw call and the locally modified draw call of FIG. 4 in greater detail, according to one embodiment of the present invention.

FIG. 5 is a conceptual diagram illustrating the draw call 410 and the locally modified draw call 420 of FIG. 4 in greater detail, according to one embodiment of the present invention. As shown, the draw call 410 includes draw call parameters 510 and API data 515. Similarly, the locally modified draw call 420 includes locally modified draw call parameters 520 and locally modified API data 525. As also shown, the draw-call shader 330 of FIG. 3 receives the draw call 410 as an input and generates the locally modified draw call 420 as an output. More specifically, the draw-call shader 330 may read draw call parameters 510 and API data 515 and write locally modified draw call parameters 520 and locally modified API data 525.

The draw call parameters 510 and the locally modified draw call parameters 520 both include various different types of data representing the geometry state associated with the draw call 410 and the locally modified draw call 420 respectively. For example, data included in the draw call parameters 510 may include direct parameters of the draw call 410. Similarly, data included in the locally modified draw call parameters 520 may include direct parameters of the locally modified draw call 420. Note that the quantity of data included in the locally modified draw call parameters 520 may be greater than, less than, or equal to the quantity of data included in the draw call parameters 510. Further, data included in the locally modified draw call parameters 520 may differ from or be identical to the data included in the draw call parameters 510 in any combination. In other words, a subset of the data may be identical, all of the data may be identical, or none of the data may be identical.

The API data 515 and the locally modified API data 525 both include various different types of data representing the shader state associated with the draw call 410 and the locally modified draw call 420 respectively. For example, API data 515 may include shader parameters associated with the draw call 410. Similarly, API data 525 may include shader parameters associated with the locally modified draw call 420. Note that the quantity of data included in the locally modified API data 525 may be greater than, less than, or equal to the quantity of data included in the API data 515. Further, data included in the locally modified API data 525 may differ from or be identical to the data included in the API data 515 in any combination. In other words, a subset of the data may be identical, all of the data may be identical, or none of the data may be identical.

Figure 6:
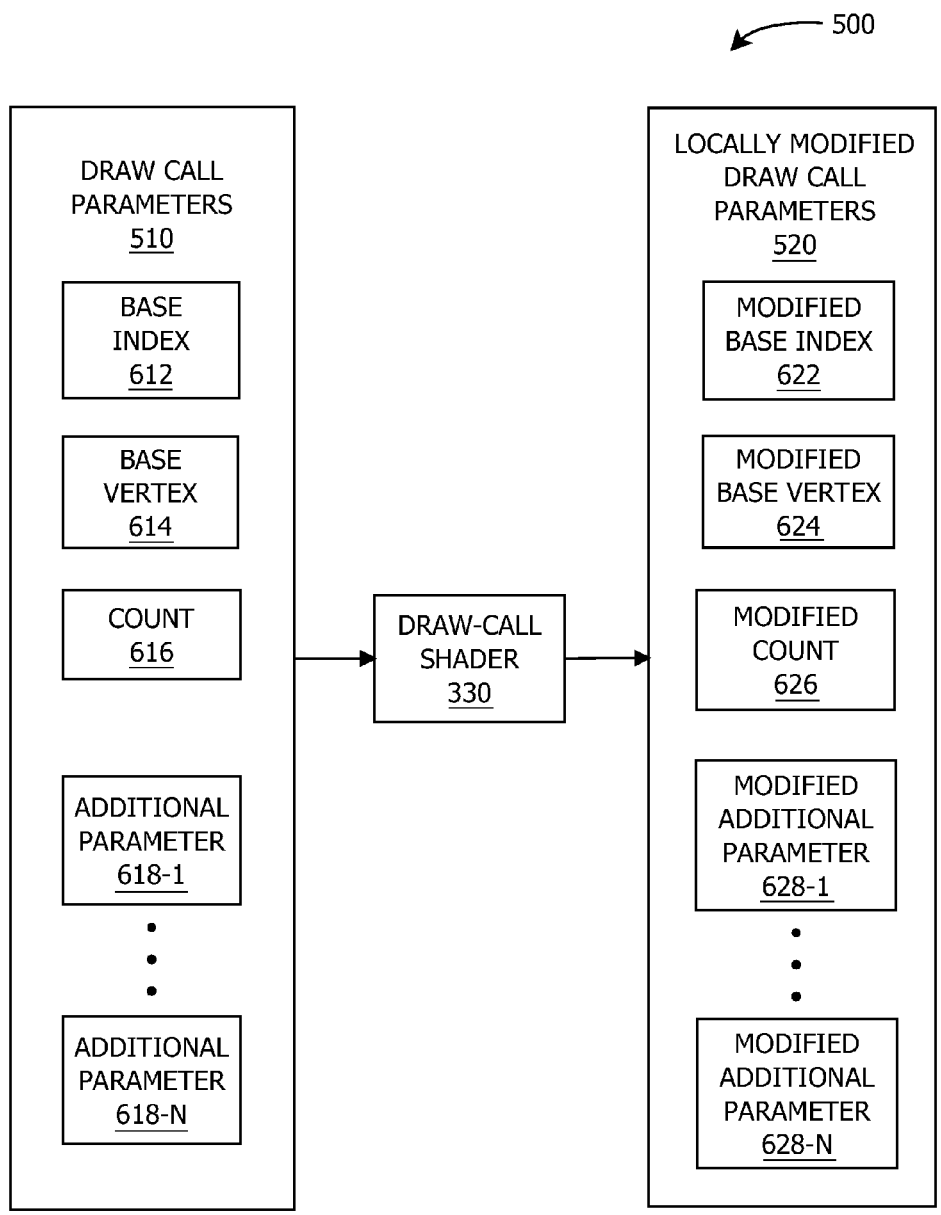
FIG. 6 is a conceptual diagram illustrating the draw call parameters and the locally modified draw call parameters of FIG. 5 in greater detail, according to one embodiment of the present invention.

FIG. 6 is a conceptual diagram illustrating the draw call parameters 510 and the locally modified draw call parameters 520 of FIG. 5 in greater detail, according to one embodiment of the present invention. As shown, the draw call parameters 510 include a base index 612, a base vertex 614, a count 616, and one or more additional parameters 618. Similarly, the locally modified draw call parameters 520 include a modified base index 622, a modified base vertex 624, a modified count 626, and one or more modified additional parameters 628.

As previously described herein, the draw call parameters 510 and the locally modified draw call parameters 520 both include various different types of data representing the geometry state associated with the draw call 410 and the locally modified draw call 420 respectively. As also previously described herein, the draw-call shader 330 of FIG. 3 receives the draw call parameters 510 as an input and generates the locally modified draw call parameters 520 as an output. More specifically, the draw-call shader 330 may read any number, including zero, of the draw call parameters 510 and, subsequently, write any number, including zero, of the locally modified draw call parameters 520.

For example, as noted above in conjunction with FIG. 4, in some embodiments the draw-call shader 330 could be configured to perform a visibility test. More specifically, after evaluating the draw call parameters 510, if the draw-call shader 330 determined that the primitive associated with the draw call 510 was not visible, then the draw-call shader 330 would include a modified count 626 of zero in the locally modified draw call parameters 520. As a result of this modification, subsequently causing the locally modified draw call 420 to be executed within the graphics processing pipeline 430 would not result in image data being rendered for display. Advantageously, such a modification would decrease the time required to render the image.

In alternative embodiments, the draw call parameters 510 may not include one or more of the base index 612, the base vertex 614, the count 616, and additional parameters 618. Similarly, the locally modified draw call parameters 520 may not include one or more of the modified base index 622, the modified base vertex 624, the modified count 626, and modified additional parameters 628. For example, in one alternative embodiment, the draw call parameters 510 may include only the additional parameter 618-1, whereas the locally modified draw call parameters 520 may include only the modified count 626.

Figure 7:
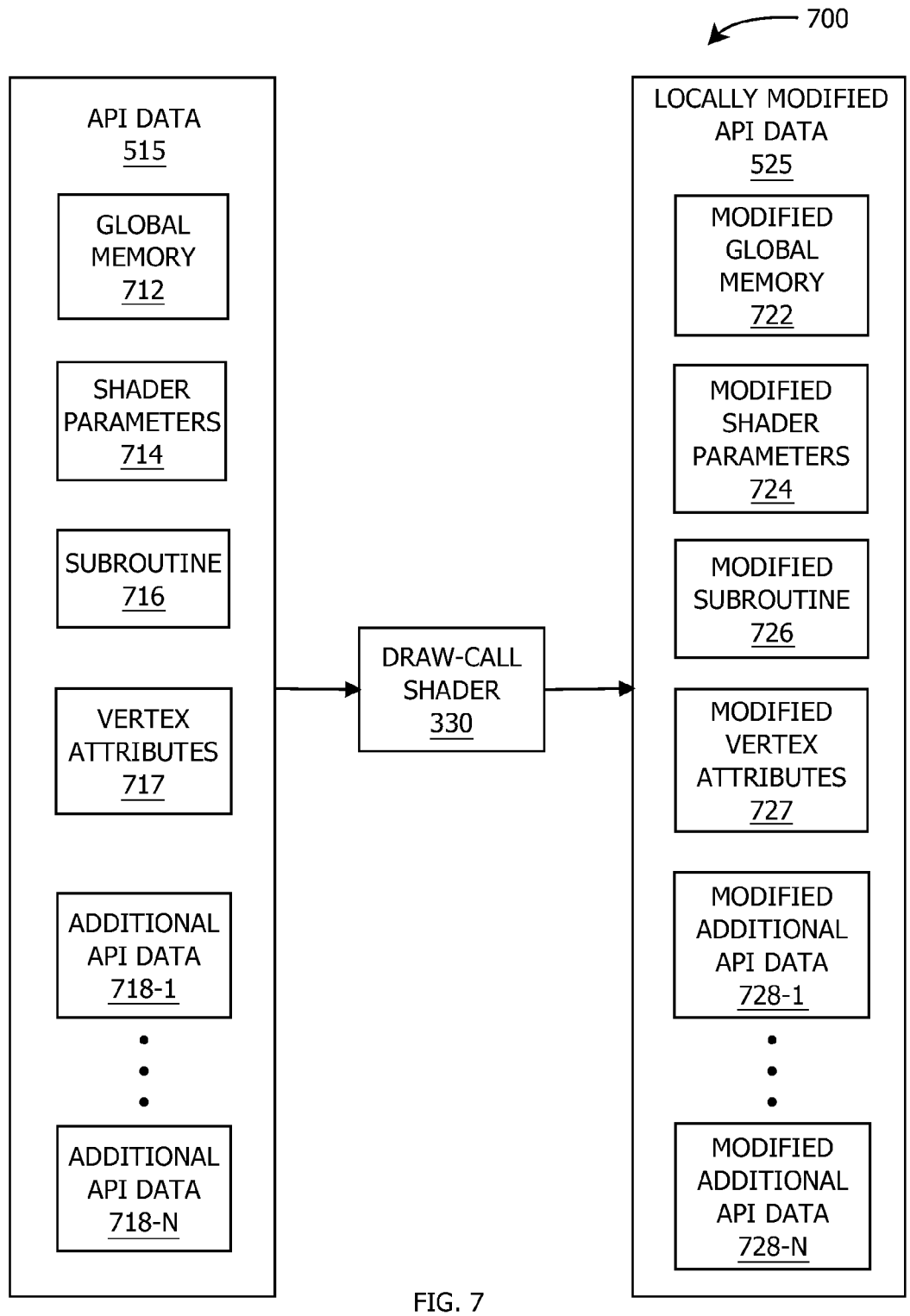
FIG. 7 is a conceptual diagram illustrating the API data and the locally modified API data of FIG. 5 in greater detail, according to one embodiment of the present invention.

FIG. 7 is a conceptual diagram illustrating the API data 515 and the locally modified API data 525 of FIG. 5 in greater detail, according to one embodiment of the present invention. As shown, the API data 515 includes a global memory 712, shader parameters 714, a subroutine 716, vertex attributes 717, and one or more additional API data 718. Similarly, the locally modified API data 525 includes a modified global memory 722, modified shader parameters 724, a modified subroutine 726, modified vertex attributes 727, and one or more modified additional API data 728.

As previously described herein, the API data 515 and the locally modified API data 525 both include various different types of data representing the shader state associated with the draw call 410 and the locally modified draw call 420 respectively. As also previously described herein, the draw-call shader 330 of FIG. 3 receives the API data 515 as an input and generates the locally modified API state 525 as an output. More specifically, the draw-call shader 330 may read any amount, including zero, of API data 515 and, subsequently, write any amount, including zero, of locally modified API data 525.

For example, as noted above in conjunction with FIG. 4, in one embodiment the draw-call shader 330 could be configured to increase overall execution speed by identifying any vertex attributes 717 requiring modification which were constant over all of the vertices affected by the draw call 420. More specifically, after evaluating the API state 525 and before calculating data specific to a particular vertex, if the draw-call shader 330 determined that one or more of the vertex attributes 717 requiring modification was constant over all of the vertices affected by the draw call 420, then the draw-call shader 330 would perform the calculations associated with determining the corresponding locally modified vertex attributes 727 once, instead of once per vertex.

In alternative embodiments, the API data 515 may not include one or more of the global memory 712, shader parameters 714, the subroutine 716, the vertex attributes 717, and additional API data 718. Similarly, the locally modified API data 525 may not include one or more of the modified global memory 722, the modified shader parameters 724, the modified subroutine 726, the modified vertex attributes 727, and modified additional API data 728.

Figure 8:
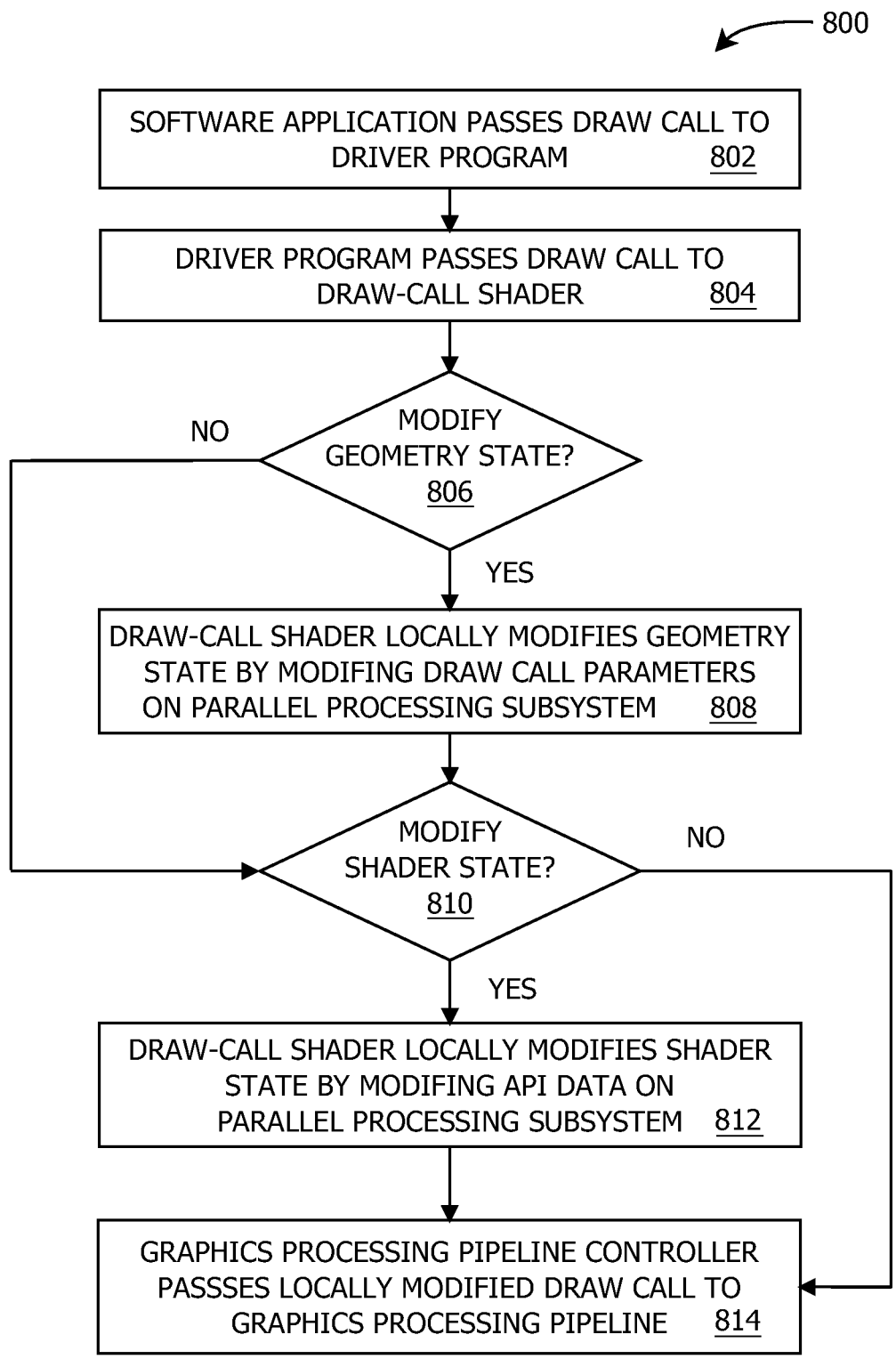
FIG. 8 is a flow diagram of method steps for locally modifying draw calls, according to one embodiment of the present invention.

FIG. 8 is a flow diagram of method steps for locally modifying draw calls 410, according to one embodiment of the present invention. Although the method steps are described with reference to the systems of FIGS. 1-7, persons skilled in the art will understand that any system configured to implement the method steps, in any order, falls within the scope of the present invention.

As shown, a method 800 begins at step 802, where the software application 125 passes the draw call 410 to the driver program 130. At step 804, the driver program 130 passes the draw call 410 to the draw-call shader 330. At step 806, the draw-call shader 330 evaluates the draw call 410 to determine whether to locally modify the geometry state associated with the draw call 410. The draw-call shader 330 may perform this evaluation in any technically feasible manner. For example, as previously disclosed, the draw-call shader 330 may use information included in the draw call 410 in conjunction with data from previous rendering operations to perform a visibility test. If, at step 806, the draw-call shader 330 determines not to modify the draw call 410 by locally modifying the geometry state, then the method 800 proceeds to step 810.

If, at step 806, the draw-call shader 330 determines to modify the draw call 410 by locally modifying the geometry state, then the method 800 proceeds to step 808. At step 808, the draw-call shader 330 locally modifies the geometry state of the draw call 410 by generating locally modified draw call parameters 520 included in the locally modified draw call 420. Advantageously, calculations and memory accesses associated with generating the locally modified draw call 420 are performed within (i.e., local to) the parallel processing subsystem 112.

The method then continues at step 810, where the draw-call shader 330 evaluates the draw call 410 to determine whether to locally modify the shader state associated with the draw call 410. Again, the draw-call shader 330 may perform this evaluation in any technically feasible manner. If, at step 810, the draw-call shader 330 determines not to modify the draw call 410 by locally modifying the shader state, then the method 800 proceeds to step 814.

If, at step 810, the draw-call shader 330 determines to modify the draw call 410 by locally modifying the shader state, then the method 800 proceeds to step 812. At step 812, the draw-call shader 330 locally modifies the shader state of the draw call 410 by generating locally modified API data 525 included in the locally modified draw call 420. Again, calculations and memory accesses associated with generating the locally modified draw call 420 are performed within (i.e., local to) the parallel processing subsystem 112.

The method then continues at step 814, where the draw-call shader 330, passes the locally modified draw call 420 to the graphics processing pipeline 430.

In sum, draw calls may be more effectively implemented by transferring draw call computations that have typically been executed by a CPU to a parallel processing subsystem that is configured to process draw calls. In one embodiment, the CPU first passes a draw call and included graphics state information to a draw-call shader program that executes on the parallel processing subsystem. The draw-call shader program then evaluates the draw call and included graphics state information. During this evaluation, the draw-call shader program may consider additional available data, such as data from previous rendering operations. Based on this evaluation, the draw-call shader may modify the draw call locally (i.e., subsequent draw calls are unaffected by any modifications the draw-call shader program makes to this particular draw call). More specifically, the draw-call shader program may modify geometry state information included in the graphics state information by modifying draw call parameters, such as a base index, a base vertex, and count data. Additionally, the draw-call shader program may modify shader state information included in the graphics state information by modifying API data, such as global memory, shader parameters, subroutines, and vertex attributes. Finally, after generating the locally modified draw call, the draw-call shader program causes the locally modified draw call to be executed within the graphics processing pipeline.

Advantageously, the draw-call shader program allows draw call calculations to be executed on-the-fly instead of pre-calculated by the CPU and subsequently stored in system memory. Thus, the amount of system memory used to render graphics may be significantly reduced. Furthermore, since such data is generated locally (i.e., within the parallel processing subsystem), the amount of data transferred between the CPU and the parallel processing system may be correspondingly reduced. Consequently, the likelihood of straining the system memory bandwidth may be decreased compared to prior-art approaches, and overall system performance may increase accordingly. Yet another advantage is that, since draw call calculations are typically performed more efficiently by the parallel processing subsystem than by the CPU, overall processing efficiency of the graphics processing pipeline may improve, especially for complex graphics scenes.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for processing draw calls in a processing subsystem, the method comprising:
   receiving a draw call from a software application;
   evaluating graphics state information included in the draw call;
   generating, via a shader program executed by a graphics processing unit (GPU), modified graphics state information;
   generating a modified draw call that includes the modified graphics state information; and
   causing the modified draw call to be executed within a graphics processing pipeline.

2. The method of claim 1, wherein the graphics state information includes geometry state information.

3. The method of claim 2, wherein evaluating the graphics state information includes determining that modified geometry state information should be generated.

4. The method of claim 3, wherein generating the modified geometry state information includes generating one or more modified draw call parameters.

5. The method of claim 4, wherein the one or more modified draw call parameters include at least one of a base index, a base vertex, and count data.

6. The method of claim 1, wherein the graphics state information includes shader state information.

7. The method of claim 6, wherein evaluating the graphics state information includes determining that modified shader state information should be generated.

8. The method of claim 7, wherein generating the modified shader state information includes generating modified API state information.

9. The method of claim 8, wherein the modified API state information includes at least one of a global memory, a shader parameter, a subroutine, and vertex attribute data.

10. The method of claim 1, wherein causing the modified draw call to be executed within a graphics processing pipeline does not result in image data being rendered for display.

11. A non-transitory computer-readable storage medium including instructions that, when executed by a processing unit, cause the processing unit to process draw calls by performing the steps of:
   receiving a draw call from a software application;
   evaluating graphics state information included in the draw call;
   generating, via a shader program executed by a graphics processing unit (GPU), modified graphics state information;
   generating a modified draw call that includes the modified graphics state information; and
   causing the modified draw call to be executed within a graphics processing pipeline.

12. The non-transitory computer-readable storage medium of claim 11, wherein the graphics state information includes geometry state information.

13. The non-transitory computer-readable storage medium of claim 12, wherein evaluating the graphics state information includes determining that modified geometry state information should be generated.

14. The non-transitory computer-readable storage medium of claim 13, wherein generating the modified geometry state information includes generating one or more modified draw call parameters.

15. The non-transitory computer-readable storage medium of claim 14, wherein the one or more modified draw call parameters include at least one of a base index, a base vertex, and count data.

16. The non-transitory computer-readable storage medium of claim 11, wherein the graphics state information includes shader state information.

17. The non-transitory computer-readable storage medium of claim 16, wherein evaluating the graphics state information includes determining that modified shader state information should be generated.

18. The non-transitory computer-readable storage medium of claim 17, wherein generating the modified shader state information includes generating modified API state information.

19. The non-transitory computer-readable storage medium of claim 18, wherein the modified API state information includes at least one of a global memory, a shader parameter, a subroutine, and vertex attribute data.

20. The non-transitory computer-readable storage medium of claim 11, wherein causing the modified draw call to be executed within a graphics processing pipeline does not result in image data being rendered for display.

21. A system, comprising:
   a memory; and
   a graphics processing unit (GPU) coupled to the memory and configured to:
      receive a draw call;
      evaluate graphics state information included in the draw call;
      generate modified graphics state information via a shader program;
      generate a modified draw call that includes the modified graphics state information; and
      cause the modified draw call to be executed within a graphics processing pipeline.

22. The system of claim 21, wherein the memory stores instruction that, when executed by the processing unit, cause the processing unit to receive the draw call, evaluate the graphics state information, generate the modified graphics state information, generate the modified draw call, and cause the modified draw call to be executed.

* * * * *